Oct. 30, 1962  J. E. SPELLMAN  3,060,500
COMPOSITE SPINNERET PLATE UNIT
Filed Sept. 1, 1959

INVENTOR
JAMES EARL SPELLMAN
BY
ATTORNEY 3,060,500
COMPOSITE SPINNERET PLATE UNIT
James Earl Spellman, Unionville, Pa., assignor to E. I.
du Pont de Nemours and Company, Wilmington, Del.,
a corporation of Delaware
Filed Sept. 1, 1959, Ser. No. 837,467
3 Claims. (Cl. 18—8)

This invention relates to new and improved apparatus for the spinning of synthetic organic filaments. More particularly, it relates to a spinneret which is especially adapted for the melt spinning of filaments of synthetic linear condensation polymers and other melt spinnable materials. The invention also relates to a process for manufacturing such spinnerets.

Filaments of synthetic linear condensation polymers, such as polyesters and polyamides, are generally produced by extruding a molten polymer through capillary passageways in a spinneret. The passageway outlet sections are usually round in cross section, although they may have a rectangular, cruciform, or other cross section depending on the desired cross section of the extruded filaments. The melt extrusion process is usually carried out at high temperatures, frequently on the order of 300° C. or even higher, and high pressures of from about 250 to about 2000 p.s.i., or higher, are generally used. The spinneret must accordingly have sufficient strength to withstand the high pressures employed, and the material of which it is constructed must be sufficiently refractory to withstand the high temperatures. Stainless steel is frequently employed. In order to provide sufficient rigidity and yet keep the length of the capillary passageway small to minimize the pressure, a relatively thick spinneret plate is usually employed and a counterbore on the polymer melt face is provided over the capillary passageway. An example of such a spinneret is shown by Jones in his U.S. Patent 2,341,555, in which each orifice consists of a capillary passageway outlet section with a straight cylindrical wall, a counterbore inlet section with an approximately straight cylindrical wall, and a tapered intermediate section having a frusto-conical wall directly connecting the end of the inlet section with the beginning of the outlet section. Another example is shown by Clouzeau in his U.S. Patent 2,742,667, in which each passageway consists of a capillary outlet section with a straight cylindrical wall and a tapered counterbore or countersink inlet section with a frusto-conical wall directly connecting with the outlet section.

At least two major problems have been associated with the spinnerets which have been employed hitherto. First, the intersecting surfaces or edges forming the orifices at the extrusion face of the spinneret must be sharply defined for good operability of spinning, but they are easily scratched, nicked, or otherwise damaged due to insufficient hardness of the material usually employed for constructing the spinnerets. Even when the spinnerets are carefully handled, the jetting of the polymer from the orifices under high pressure erodes the orifices rapidly during normal use, so that the spinnerets must be removed from production for repair. After having been repaired a few times, such a spinneret is usually discarded. Second, molten linear condensation polymers exhibit moderate to high wetting action on the metals of which the spinnerets are usually constructed, including metals containing carbon or carbides. This wetting action causes a "bulge" or elongated drop to be formed and stored on the extrusion face at the extrusion orifice continually during spinning. Such a bulge seriously increases the quenching time for whatever filaments are formed and ultimately contributes to production of nonuniformities in the filaments, including denier nonuniformities. Eventually these bulges form into "drips," i.e., drops of molten polymer, which obviate the normal jetting action of the polymer and the production of any filaments whatsoever. It is then necessary to wipe the extrusion face of the spinneret at frequent intervals during spinning in order that the normal spinning action may be resumed. Often, the denier of the filaments being prepared will vary as the drips form. Wetting of the metal by the polymer also causes films of the polymer to be retained at the hole edges for a time sufficient to allow degradation of small amounts of polymer, causing quality problems in the product and contributing to the drip problem. This problem is especially severe with the polyamides.

It is an object of this invention to provide a spinneret having improved wear life and jetting action. Another object is to provide a spinneret having high mechanical strength and resistance to hot viscous liquids which is yet characterized by a long wear life and resistance to the formation of "bulges" and "drips" during spinning. An additional object is to provide a process for producing such spinnerets. Other objects will be apparent from the following description and claims.

These objects are accomplished according to this invention by providing a novel spinneret which includes a metallic plate having a ceramic coating bonded thereto. A plurality of extrusion passageways extend completely through the coated spinneret, and at least the outlet portions of the passageways are of capillary cross section. When referring to the outlet portions of the extrusion passageways, "capillary cross section" is intended to define a cross section wherein the least transverse distance across the passageway will be no greater than about 0.1 inch. For most spinneret assemblies, this distance will be between about 0.001 and about 0.1 inch.

The layer of ceramic material is continuous across the face of the spinneret except where the extrusion passageways pass through the layer, such that at least the edges defining each extrusion orifice are formed within the ceramic layer. The ceramic material may form only a thin coating at the extrusion face of the spinneret, or may be sufficiently thick that a substantial portion or the entire length of the capillary section of the passageway may be formed within the ceramic layer. In the latter case, the thickness may be such that a portion of the counterbore section of the passageway is also formed within the ceramic layer, if desired. However, in any case, the ceramic layer comprises only a minor proportion of the total thickness of the spinneret, the major proportion of the spinneret being comprised of metal. Preferably, the ceramic layer comprises only about ⅙ or less of the total thickness of the spinneret.

The invention also comprehends a process for producing spinnerets of the type described comprising forming a metallic spinneret containing at least one passageway extending therethrough, inserting into the orifice a plug at least slightly longer than the passageway but otherwise having exterior surfaces corresponding in shape and size to the surface of the passageway, at least at the outlet portion of the passageway, such that the plugs protrude from the extrusion face of the spinneret to an extent substantially equal to the desired coating thickness; flame coating a layer of hard material consisting essentially of a metallic oxide having a melting point above about 600° C. on the extrusion face of the spinneret; removing any amount of the layer to provide a smooth, flat surface flush with the tip of the plug; and removing the plug from the spinneret. Preferably, the plug has an upper and lower section, the diameter of the upper section being substantially greater than that of the lower section, which usually is of capillary cross section and of a configuration conforming to that of the desired filaments prepared from the finished spinneret.

These sections of the plug are preferably joined by a tapered section. Preferably, the plugs are made of a suitable material which is capable of being dissolved or etched away by a suitable solvent or reagent.

The invention will be more fully understood by reference to the accompanying drawings, in which.

Figure 1:
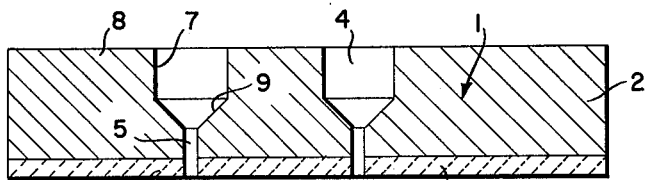
FIGURE 1 is a transverse vertical sectional view on an enlarged scale of a spinneret comprising one embodiment of the present invention.

Referring now to FIGURE 1, spinneret 1 is comprised of a relatively thick metallic disk 2 to which is firmly bonded a layer of ceramic material 3. The spinneret is perforated by a plurality of extrusion passageways 4. The passageways comprise a straight-walled, capillary outlet section 5 opening on the extrusion face 6 and a counterbore section 7 of larger diameter opening on the polymer melt face 8, with a tapering connecting section 9 between the counterbore and the capillary sections. In the embodiment shown in FIGURE 1, the walls of most of the length of the capillary section 5 of passageway 4 are defined by the metallic portion 2 of the spinneret; however, the terminal portions of the walls of the capillary section are defined by the ceramic layer 3 of the spinneret. In a typical example, the ceramic layer comprises alumina 0.003 inch in thickness bonded to a stainless steel disk 0.5 inch in thickness, the passageways comprising a capillary section 0.012 inch in diameter having a total length of 0.024 inch and a counterbore section 0.0625 inch in diameter joined to the capillary section by a connecting section having a taper angle of 90°. The taper angle is measured as the included angle between the extended walls of tapered section 9.

Figure 2:
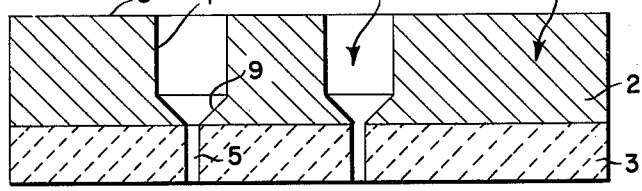
FIGURE 2 is a similar view of a spinneret comprising another embodiment of the invention.

FIGURE 2 illustrates a spinneret similar to that shown in FIGURE 1, except that a thicker layer of ceramic material is bonded to the metallic disk. In this case, the walls of the entire length of the capillary section 5 are defined by the ceramic layer. A typical example comprises a stainless steel disk 0.48 inch in thickness to which is bonded a layer of alumina 0.024 inch in thickness, the capillary section of the passageway being 0.012 inch in diameter and 0.024 inch in length and the counterbore being 0.0625 inch in diameter with a connecting section having a taper angle of 90°.

Figure 3:
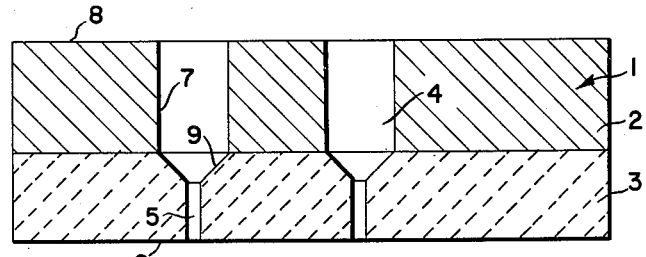
FIGURE 3 is a similar view of a spinneret comprising still another embodiment of the invention.

FIGURE 3 illustrates a spinneret in which the thickness of the ceramic layer is further increased, such that the walls of the tapering section connecting the capillary section with the counterbore are also defined by the ceramic layer. In a typical example, the spinneret comprises a stainless steel disk 0.425 inch in thickness to which is bonded a layer of alumina 0.0492 inch in thickness, corresponding to the combined lengths of the capillary section (0.024 inch long and 0.012 inch in diameter) and the 90° taper connecting section, the counterbore being 0.0625 inch in diameter.

Figure 4:
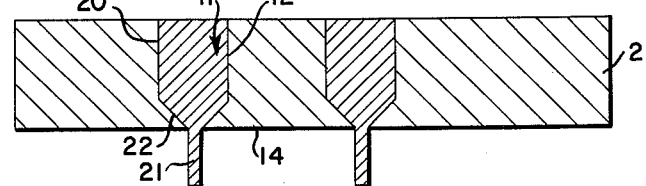
FIGURE 4 illustrates an early stage in the manufacture of the spinneret of FIGURE 2.
Figure 5:
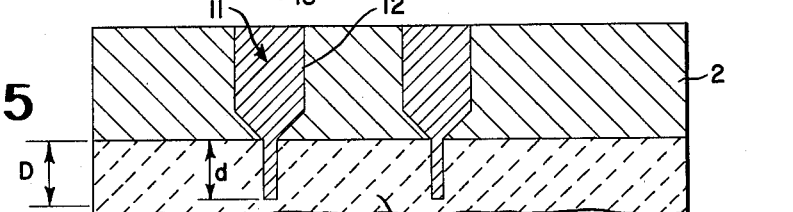
FIGURE 5 illustrates an intermediate stage in the manufacture of the spinneret in FIGURE 2.
Figure 6:
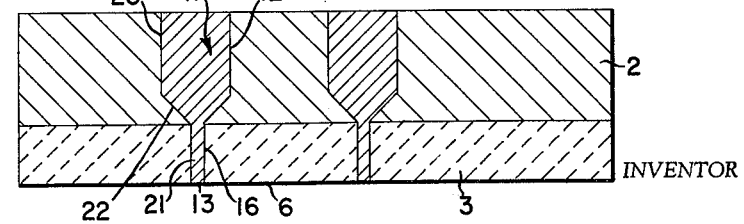
FIGURE 6 illustrates a late stage in the manufacture of the spinneret of FIGURE 2.

The process of producing spinnerets in accordance with the present invention is illustrated in FIGURES 4–6. As shown in FIGURE 4, plugs 11, each having an upper section 20 and lower section 21 joined by tapering section 22, are inserted into orifices 4 of metallic disk 2, with the tips 13 of the plug protruding from the extrusion face of the disk to an extent substantially equal to the desired coating thickness. The lower surface of the metallic disc should be quite clean and free from particles of rust, organic substances, and other materials and preferably the surface should be roughened, such as by sand blasting it. The plugs 11 and the passageways 4 are formed with relatively close tolerances such that a mating alignment is achieved.

After the plugs have been inserted into the metallic disk, the lower face 14 of the disk is flame coated with a layer 15 of ceramic material, shown in FIGURE 5. The layer of ceramic material should be sufficiently thick that the minimum depth D exceeds only slightly the distance $d$ by which the plugs 11 protrude from the metallic disk. After the ceramic layer has been formed on the metallic disk, a portion of the layer is subsequently removed by any of the various known grinding, brushing, or lapping procedures to provide a smooth, flat surface 6 flush with the tips 13 of the plugs, as shown in FIGURE 6. The spinneret is then completed by removing plugs 11 to provide a coated spinneret as shown in FIGURE 2. If the fit of the plugs in the holes 12 and newly formed capillaries 16 is sufficiently loose, the plugs may be removed by tapping the tips of the plugs gently. However, in most cases it is simply preferred to dissolve the plugs with a suitable agent or to etch the plugs until they are readily removed. In general, dissolving or etching the plugs away produces more sharply defined hole or orifice edges.

Although the procedure illustrated in FIGURES 4–6 is specifically directed toward the production of the spinneret shown in FIGURE 2, it will be obvious that the same procedure can be employed to produce the spinnerets of FIGURE 1 or 3 simply by varying the thickness of the metallic disk and the shape of the holes in the disk and by flame coating the appropriate depth of ceramic material to the disk.

The following examples illustrate specific embodiments of the invention.

*Example 1*

A disc of No. 430 stainless steel 2 1/32 inch in diameter and 3/16 inch thick is drilled to provide a straight-walled counterbore hole 1/8 inch in diameter on the upper surface, terminating in a 90° tapered portion leading to an orifice 0.078 inch in diameter at the lower surface of the disc. The lower surface of the disc is thoroughly cleaned and sand-blasted. A brass plug, having a straight-walled upper section 1/8 inch in diameter and a straight-walled lower section 0.078 inch in diameter and 0.098 inch long which is connected to the upper section by a 90° tapered section, is inserted firmly into the hole in the stainless steel disc, so that the entire 0.098 inch lower section protrudes from the extrusion face of the spinneret, as shown in FIGURE 4. Aluminum oxide powder is then flame-sprayed from a conventional oxyacetylene flame-spraying apparatus onto the lower surface of the stainless steel disc to a depth slighly in excess of 0.1 inch. The surface of the aluminum oxide coating is then lapped until the tip of the brass plug is just exposed, after which the surface is polished. The brass plug is then etched out with dilute nitric acid, leaving a 0.078 inch diameter capillary orifice in the aluminum oxide coating, which has a thickness of 0.098 inch.

Polyhexamethylene adipamide having a relative viscosity of 38 is then spun at a rate of 20 grams per minute from the spinneret at 290° C. to produce monofilament yarn, which is collected 6 feet below the spinneret (gravity flow of the spun filament). Very little "bulge" of the molten polymer at the extrusion face of the spinneret is noted, and it is observed that the filament bows out markedly during spinning under the influence of the quenching air, indicating that the filament is quenched readily after spinning. The filament is fully quenched prior to its arrival at the collection point. After a series of spinning runs totaling several weeks, very little wear or erosion at the edges of the orifice is observed.

A control disc of No. 430 stainless steel having a diameter of 2 1/32 inch and a thickness of 3/16 inch is drilled to provide a straight-walled counterbore hole ⅛ inch in diameter on the upper surface and a 0.078 inch diameter capillary section 0.098 inch in length opening at the lower surface and being connected to the upper section by a 90° tapered section. Polyhexamethylene adipamide having a relative viscosity of 38 is spun at a rate of 20 grams per minute at a temperature of 290° from this spinneret as in the experiment described above, and with other conditions also being maintained the same, in an attempt to produce a monofilament yarn. In this instance, however, a marked bulge in the molten polymer as it leaves the spinneret orifice is noted, such that a large volume of molten polymer is suspended below the spinneret under equilibrium conditions of spinning. Very little bowing of the filament is noted despite the use of quenching air at the same rate used in the experiment above indicating that the filament is not quenched readily after spinning. The spun filament is still molten as it arrives at the collection point 6 feet below the spinneret.

*Example II*

A disc of No. 430 stainless steel 2½₂ inch in diameter and ³⁄₁₆ inch thick is drilled to provide a straight-walled counterbore hole ⅛ inch in diameter on the upper surface and a 0.078 inch diameter capillary section 0.066 inch in length opening at the lower surface and being connected to the upper section by a 90° tapered section. The lower surface of the disc is thoroughly cleaned and sand-blasted. A brass plug having the dimensions specified in Example I is inserted firmly into the hole so that the lower section protrudes 0.032 inch from the extrusion face of the spinneret. Aluminum oxide is then flame-sprayed onto the lower surface of the disc to a depth of about 0.035 inch. The surface of the aluminum oxide coating is then lapped until the tip of the brass plug is just exposed, to provide a coating of 0.032 inch thickness. The surface is then polished and the brass plug etched out with dilute nitric acid, leaving a 0.078 inch diameter capillary passageway through the aluminum oxide coating.

Polyhexamethylene adipamide having a relative viscosity of 38 is then spun at a rate of 20 grams per minute from the spinneret at 290° C. to produce monofilament yarn, employing the same spinning conditions used in Example 1. Very little "bulge" of the molten polymer at the extrusion face of the spinneret is noted, and it is observed that the filament bows out markedly during spinning under the influence of the quenching air. The filament is fully quenched prior to its arrival at the collection point. Very little wear or erosion at the orifices can be observed after several weeks operation.

*Example III*

A straight-walled hole ⅛ inch in diameter is drilled in a disc of No. 430 stainless steel 2½₂ inch in diameter and ³⁄₁₆ inch thick. The lower surface of the disc is thoroughly cleaned and sand-blasted. A brass plug having the dimensions specified in Example I is inserted firmly into the hole so that the entire length of the tapered section just protrudes from the lower face of the disc, after which the lower face is flame-sprayed with aluminum oxide, lapped, and polished as in the preceding examples. The brass plug is then etched out with dilute nitric acid to provide a coating 0.120 inch thick, the capillary section being 0.098 inch in height, the tapered section height being 0.022. Polyhexamethylene adipamide having a relative viscosity of 38 is spun at a rate of 20 grams per minute at 290° C. from the spinneret, with results similar to those of Example II.

Any of the various metals generally regarded as satisfactory for making spinnerets may be employed in the upper portion of the spinneret. Such metals include steel, especially "stainless" steel; aluminum; titanium; tantalum; and niobium. Such metals are characterized by high mechanical strength, by melting points far above the normal temperatures used in spinning with and cleaning the spinnerets (up to 600° C.), and resistance to shock, abrasion, and corrosion.

It is particularly important that the metallic plate comprise a major proportion of the total thickness of the spinneret. The upper portion of the spinneret, which contains most of the polymer within the spinneret at any given time, is thereby adapted to provide across the plate the rapid transfer of heat which is essential to good uniformity of spinning, especially for spinnerets containing a multiplicity of holes. One practicing this invention, then, can utilize spinnerets of normal thickness while achieving optimum strength and heat transfer characteristics.

The plugs are preferably made of brass or other material which is rigid and at the same time capable of being dissolved away by an agent which will not affect the material of which the upper portion of the spinneret is formed and capable of maintaining its structure during the flame spraying procedures. In the case of stainless steel as the spinneret disk material and brass as the plug material, dilute nitric acid is found to dissolve away the brass without noticeably affecting the stainless steel.

The ceramic coating which is bonded to the metallic spinneret may be composed of any metal oxide melting above about 600° C., preferably 1000° C., which solidifies from the state of a fused coating into a hard-surfaced coating insoluble in water and organic liquids, including hot polymeric liquids. Among such metal oxides are alumina (aluminum oxide, $Al_2O_3$), silica (silicon dioxide, $SiO_2$), chromium sesquioxide ($Cr_2O_3$), beryllium oxide (BeO), zirconium oxide ($ZrO_2$), and titania (titanium dioxide $TiO_2$). Mixtures of the oxides may be used if desired, and materials other than metal oxides may be added to the ceramic composition. Other non-essential compositions, such as pigments and fillers, may obviously be added in slight proportions provided, of course, that such compositions do not detract from the low wettability characteristics of the ceramic.

In a highly preferred embodiment of the invention, the ceramic layer is comprised of alumina. Alumina is readily flame-sprayed by any of the various known techniques and bonds well with metals, especially stainless steel, to achieve coatings of good to excellent density. The flame-sprayed alumina coatings have a very low wettability propensity with respect to molten polymers and exhibit high resistance to abrasion and corrosion.

The flame coating or plating procedure may be carried out by any of various known methods employing ceramic material in the form of a rod or in powdered form in which the ceramic material is heated to the molten state and projected or sprayed upon the metallic disk in the form of fine globules which are thereby bonded to the metallic disk. The heating of the ceramic material may be accomplished by means of a flame produced by chemical burning, such as an oxyacetylene flame, either in the form of a continuous flame or as a continual series of detonations. Heating may also be accomplished by means of a flame produced by electrical means, such as a plasma jet or arc. Examples of such procedures are described by Poorman et al. in U.S. Patent 2,714,563; by Stackhouse et al. in "Product Engineering," vol. 29, pages 104–6, December 8, 1958; by Ault in the "Journal of the American Ceramic Society," vol. 40, pages 69–74, March 1, 1957; and by Oechsle in "Metal Finishing," vol. 55, pages 67–71 and page 76, December 1957.

The invention is also applicable to spinnerets for wet spinning and dry spinning. Such spinnerets are usually considerably thinner than spinnerets designed for melt spinning, since considerably lower pressures are required in the spinning operation. For this reason the passageway or hole in spinnerets for wet or dry spinning frequently comprises only a capillary section, without a counterbore section. The process for producing spinnerets for wet or dry spinning is the same as that described above for producing spinnerets for melt spinning, using a plug of the desired configuration and of capillary diameter.

Alternatively, the spinnerets of this invention may be produced by coating a steel disc with the metallic oxide, drilling the disc portion only by conventional drilling procedures, and then, by controlled X-ray beams or ultrasonic drilling, forming the capillary portion of the desired circular, rectangular, cruciform or other cross section.

I claim:

1. An improved composite spinneret plate unit for spinning filaments of polymeric material and having an extremely prolonged useful life period at operating pressures from between 250 p.s.i. and 2,000 p.s.i. and at temperatures above 600° C., said unit comprising a stainless steel plate provided with a liquid polymer contacting surface and another surface substantially parallel thereto, said other surface characterized by a roughened etched condition, a uniform layer of a wear-resistant, non-wettable, aluminum oxide material having a first surface extending evenly along and in contact with said other roughened surface of said plate securely bonded thereto over the entire area of contact, said layer provided with a second surface spaced from said first surface of said layer to define a true planar highly polished spinneret face, the structure of said plate and said layer bonded thereto provided with a plurality of passageways extending therethrough, each of said passageways having one end portion intersecting the liquid polymer contacting face of said plate and the other end portion having an accurately controlled interior surface intersecting said spinneret face substantially perpendicular thereto to form an extrusion orifice, each orifice precisely defined by a first edge lying in the spinneret polished planar face and second edge lying in the accurately controlled interior surface of said other end portion of the passageway lying in the said ceramic layer, said ceramic layer and said accurately controlled surfaces thereof forming the edges of said orifices, cooperating to maintain proper jet action during spinning while preventing wetting of the orifice structure, sticking, or dripping of the polymeric material and minimizing orifice erosion.

2. An improved composite spinneret plate unit for spinning filaments of polymeric material and having an extremely prolonged useful life period at operating pressures from between 250 p.s.i. and 2,000 p.s.i. and at temperatures above 600° C., said unit comprising a metallic plate provided with a liquid polymer contacting surface and another surface substantially parallel thereto, said other surface characterized by a roughened etched condition, a uniform layer of a wear-resistant, non-wettable, ceramic material having a first surface extending evenly along and in contact with said other roughened surface of said plate securely bonded thereto over the entire area of contact, said layer provided with a second surface spaced from said first surface of said layer to define a true planar highly polished spinneret face, the structure of said plate and said layer bonded thereto provided with a plurality of passageways extending therethrough, each of said passageways having one end portion intersecting the liquid polymer contacting face of said plate and the other end portion having an accurately controlled interior surface intersecting said spinneret face substantially perpendicular thereto to form an extrusion orifice, each orifice precisely defined by a first edge lying in the spinneret polished planar face and a second edge lying in the accurately controlled interior surface of said other end portion of the passageway lying in the said ceramic layer, said ceramic layer and said accurately controlled surfaces thereof forming the edges of said orifices, cooperating to maintain proper jet action during spinning while preventing wetting of the orifice structure, sticking, or dripping of the polymeric material and minimizing orifice erosion.

3. The improved unit of claim 2 in which the metallic plate is of a steel composition and the coating is a chromium oxide composition.

References Cited in the file of this patent

UNITED STATES PATENTS

| | | |
|---|---|---|
| 1,065,704 | Mershon | June 24, 1913 |
| 1,654,936 | Jones | Jan. 3, 1928 |
| 1,791,785 | Austin | Feb. 10, 1931 |
| 1,967,798 | Witte | July 24, 1934 |
| 2,403,476 | Berry et al. | July 9, 1946 |
| 2,618,989 | Cupler | Nov. 25, 1952 |
| 2,707,691 | Wheildon | May 3, 1955 |
| 2,804,645 | Wilfong | Sept. 3, 1957 |
| 2,891,277 | Sutor | June 23, 1959 |

FOREIGN PATENTS

| | | |
|---|---|---|
| 431,096 | France | June 15, 1911 |